(12) United States Patent
Mahadevan

(10) Patent No.: US 11,240,345 B2
(45) Date of Patent: Feb. 1, 2022

(54) METHOD FOR DEPLOYING AN APPLICATION WORKLOAD ON A CLUSTER

(71) Applicant: Hewlett Packard Enterprise Development LP, Houston, TX (US)

(72) Inventor: Nilakantan Mahadevan, Bangalore Karnataka (IN)

(*) Notice: Subject to any disclaimer, the term of this patent is extended or adjusted under 35 U.S.C. 154(b) by 60 days.

(21) Appl. No.: 16/446,315

(22) Filed: Jun. 19, 2019

(65) Prior Publication Data

US 2020/0404076 A1    Dec. 24, 2020

(51) Int. Cl.
  *H04L 29/08* (2006.01)
  *H04L 12/24* (2006.01)
  *G06F 8/61* (2018.01)
  *G06F 9/455* (2018.01)

(52) U.S. Cl.
  CPC ............... *H04L 67/34* (2013.01); *G06F 8/61* (2013.01); *G06F 9/45558* (2013.01); *H04L 41/0806* (2013.01); *H04L 41/0836* (2013.01); *H04L 41/0893* (2013.01); *H04L 67/10* (2013.01); *G06F 2009/45595* (2013.01)

(58) Field of Classification Search
  CPC .......... G06F 8/60; G06F 8/61; G06F 9/45558; G06F 9/5061; G06F 9/5066; G06F 9/5072; G06F 9/5077; G06F 2009/4557; G06F 2009/45595; H04L 12/4641; H04L 41/08; H04L 41/0803; H04L 41/0806; H04L 41/0823; H04L 41/0836; H04L 41/0893; H04L 67/10; H04L 67/34
  See application file for complete search history.

(56) References Cited

U.S. PATENT DOCUMENTS

| | | |
|---|---|---|
| 6,515,966 B1 | 2/2003 | Bardalai et al. |
| 10,097,620 B2 | 10/2018 | Reddy et al. |
| 10,120,734 B1 | 11/2018 | Doraiswamy et al. |
| 10,148,504 B2 | 12/2018 | Ahuja et al. |
| 10,153,941 B2 | 12/2018 | Dion et al. |
| 10,223,109 B2 | 3/2019 | Lepcha et al. |

(Continued)

OTHER PUBLICATIONS

Fazio, Maria, et al. "Open issues in scheduling microservices in the cloud." IEEE Cloud Computing 3.5 (2016): 81-88. (Year: 2016).*

(Continued)

*Primary Examiner* — Vivek Srivastava
*Assistant Examiner* — William C McBeth
(74) *Attorney, Agent, or Firm* — Jaffery Watson Mendonsa & Hamilton

(57) ABSTRACT

The present disclosure describes a plurality of examples for deploying an application workload consisting of microservice instances. The examples include federating a cluster from a plurality of computing nodes, defining a network overlay policy based on an application policy associated with the application workload, configuring one or more virtual networks in accordance with defined network overlay policy, each virtual network from one or more virtual networks connects one or more computing nodes from the two or more computing nodes of the cluster for providing layer 2 adjacency, and deploying the plurality of microservice instances on the two or more computing nodes in accordance with the network overlay policy, for executing the application workload.

17 Claims, 7 Drawing Sheets

(56) References Cited

U.S. PATENT DOCUMENTS

| | | | |
|---|---|---|---|
| 10,841,152 B1* | 11/2020 | Humphreys | G06F 9/45558 |
| 10,911,558 B1* | 2/2021 | Witzel | G06F 9/5027 |
| 2008/0304421 A1 | 12/2008 | Ramasubramanian et al. | |
| 2012/0005236 A1* | 1/2012 | Deng | G06F 8/60 |
| | | | 707/798 |
| 2012/0131193 A1* | 5/2012 | Ferris | G06F 9/5072 |
| | | | 709/226 |
| 2012/0290714 A1 | 11/2012 | Cohen | |
| 2013/0232480 A1* | 9/2013 | Winterfeldt | G06F 9/5077 |
| | | | 717/177 |
| 2013/0339991 A1 | 12/2013 | Ricci | |
| 2014/0372533 A1* | 12/2014 | Fu | H04L 67/10 |
| | | | 709/204 |
| 2016/0036725 A1* | 2/2016 | Syed | H04L 67/10 |
| | | | 709/226 |
| 2016/0124742 A1 | 5/2016 | Rangasamy et al. | |
| 2016/0371020 A1 | 12/2016 | Sarkar et al. | |
| 2017/0149931 A1 | 5/2017 | Lochhead et al. | |
| 2017/0171019 A1 | 6/2017 | Nayak et al. | |
| 2017/0242784 A1* | 8/2017 | Heorhiadi | H04L 41/0654 |
| 2017/0257432 A1* | 9/2017 | Fu | H04L 67/34 |
| 2017/0295053 A1 | 10/2017 | Tung | |
| 2018/0026856 A1* | 1/2018 | Yang | H04L 41/0893 |
| | | | 709/224 |
| 2018/0027080 A1* | 1/2018 | Yang | G06F 8/60 |
| | | | 709/224 |
| 2018/0270125 A1* | 9/2018 | Jain | H04L 41/0896 |
| 2018/0309630 A1* | 10/2018 | Zhao | H04L 41/0893 |
| 2018/0349121 A1* | 12/2018 | Bagarolo | G06F 8/60 |
| 2019/0188079 A1 | 6/2019 | Kohli | |
| 2019/0235775 A1 | 8/2019 | Zwiegincew et al. | |
| 2019/0340059 A1* | 11/2019 | Bagarolo | G06F 9/44536 |
| 2020/0067763 A1* | 2/2020 | Vytla | H04L 41/0806 |
| 2020/0192692 A1* | 6/2020 | Ghag | G06F 9/45558 |
| 2020/0296017 A1* | 9/2020 | Mazzitelli | H04L 41/0803 |
| 2020/0314006 A1* | 10/2020 | Mackie | G06F 9/5077 |
| 2020/0358876 A1* | 11/2020 | Kulkarni | H04L 67/10 |
| 2020/0401457 A1* | 12/2020 | Singhal | G06F 9/5077 |
| 2021/0019194 A1* | 1/2021 | Bahl | H04L 67/34 |
| 2021/0072912 A1 | 3/2021 | Patel et al. | |

OTHER PUBLICATIONS

Truyen, Eddy, et al. "Towards a container-based architecture for multi-tenant SaaS applications." Proceedings of the 15th international workshop on adaptive and reflective middleware. 2016. (Year: 2016).*

Barshan, Maryam, et al. "Algorithms for network-aware application component placement for cloud resource allocation." Journal of Communications and Networks 19.5 (2017): 493-508. (Year: 2017).*

Dignan, "HPE launches Composable Cloud as it wades deeper into the hybrid cloud fray", available online at <https://www.zdnet.com/article/cloud-customers-pairing-aws-microsoft-azure-more-according-to-kentik/>, Nov. 26, 2018, 27 pages.

VMware, "Managing Fault Domains in vSAN Clusters", available online at <https://docs.vmware.com/en/VMware-vSphere/6.5/com.vmware.vsphere.virtualsan.doc GUID-8491C4B0-6F94-4023-8C7A-FD7B40D0368D.html>, Apr. 18, 2018, 2 pages.

* cited by examiner

METHOD FOR DEPLOYING AN APPLICATION WORKLOAD ON A CLUSTER

BACKGROUND

The current disclosure relates to compute clusters. Clusters are systems which function as a closely coupled integrated unit taking a hybrid approach of combining the characteristics of loosely and tightly coupled systems. A cluster consists of closely coupled multiple systems running a similar instance of operating system software with the ability to share resources like storage, memory, etc. One or more application workloads are deployed and executed on the clusters.

BRIEF DESCRIPTION OF THE DRAWINGS

The following detailed description references the drawings, wherein.

DETAILED DESCRIPTION

Figure 1:
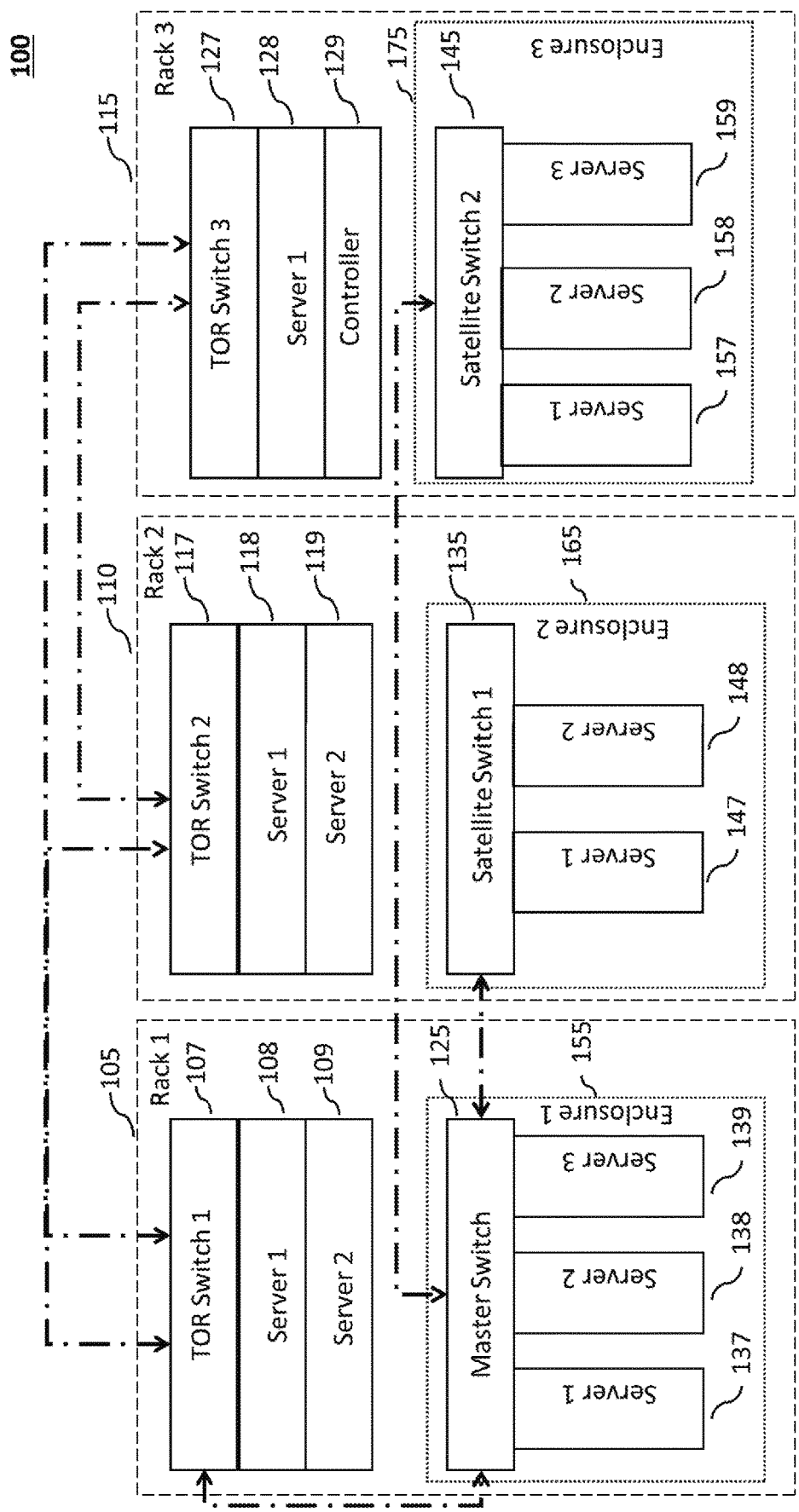
FIG. 1 is a block diagram of an example system for deploying an application workload on a cluster of computing nodes.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing particular examples only and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "coupled," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

The current disclosure discloses a method for deploying an application workload on a cluster federated from a plurality of interconnected computing nodes (also known as servers or compute devices). A conventional data center comprises a plurality of equipment including compute devices such as blade servers, rack servers; network devices such as master switches, satellite switches and Top of the Rack (ToR) switches, pass through switches, etc. In an on premise data center, upon receiving a request to deploy an application workload, it is important to dynamically provision and spin up clusters using the computing nodes that are spread across multiple racks and blade server chassis and then deploy micro-service instances to enable the application.

These computing nodes (also referred to as compute devices) which form the cluster, are either on a bare-metal host or on a hypervisor node host. For example, a KUBERNETES cluster includes multiple master nodes, multiple infrastructure and worker nodes. The multiple master nodes should be able to communicate with each other using L3 protocol (TCP/IP). However, it is important that they are also isolated to protect against network fault that can impact all of them once. Typically this is accomplished by placing them either in separate racks and connected through different ToR (Top Of the Rack) switches. In a hybrid topology environment consisting of blade servers, rack servers, master-satellite switches and ToR switches, it is important to distribute nodes of a cluster by recognizing the network topology and enclosure information to provide fault isolation amongst the nodes of the cluster. This means that any network fault (a cable pull, switch fault, virtual switch failure, etc.) or enclosure or server chassis fault (power fault, etc.) will not affect all the nodes in the cluster and the impact is minimized when the cluster nodes are distributed in a fashion that provides the best possible fault isolation.

An application workload built using micro-service architecture consists of multiple functionalities built as smaller separate services. These micro-services are deployed across a plurality of nodes of the clusters. In order to scale the application, multiple instances of the micro-services are deployed on the nodes of the cluster and the number of instances of each micro-service can vary depending on the functionality of the micro-service. In order to scale the application, multiple instances of the micro-services (also referred as micro-service instances) can be deployed which is the advantage of micro-service architecture. These instances are either containers or guest virtual machines depending on the implementation of micro-service. In an example, micro-services are deployed by having new instances as containers. For scaling containers, clusters are created (or new nodes are added to an existing cluster) with cluster federation techniques like KUBERNETES, DOCKER SWARM, and Software-defined networking is used to create the cluster networks for connecting the nodes in the cluster.

Accordingly, the current disclosure describes an example method for deploying an application workload in a cluster. The example method enables to federate clusters with computing nodes spanning across different fault domains in an automated fashion to ensure maximum isolation of computing nodes with respect to any fault in the environment. Similarly for deploying the application workload, virtual networks are created amongst the nodes of the federated cluster for the deployment of the micro-service instances. This ensures that the cluster is highly resilient to multiple levels of fault in such a hybrid environment and also ensures a well-balanced infrastructure in terms of resource usage.

Accordingly, in a first aspect, the current disclosure describes an example method for deploying an application workload. The application workload comprises a plurality of micro-service instances. The application workload is deployed on a cluster comprising two or more computing nodes from the plurality of computing nodes. Each computing node is connected to other computing nodes from the plurality of computing node by one or more network devices. The method comprising federating a cluster from a plurality of computing nodes, defining a network overlay policy based on an application policy associated with the application workload, configuring one or more virtual networks in accordance with defined network overlay policy, and deploying the plurality of micro-service instances on the two or more computing nodes in accordance with the network overlay policy, for executing the application workload. Application policy is indicative of one or more relationships between the plurality of the micro-service instances. Each virtual network from one or more virtual networks connects one or more computing nodes from the two or more computing nodes of the cluster for providing layer 2 adjacency.

In an example, the application workload is associated with a plurality of tenants. Accordingly, each micro-service instance from the plurality of micro-service instances, is associated with at least one tenant. Configuration one or more virtual networks in accordance with the defined network overlay policy further includes identifying a first set of micro-service instances associated with a first tenant and a second set of instances associated with a second tenant based on the application policy associated with the application workload and configuring a first virtual network and a second virtual network from the one or more virtual networks, wherein the first virtual network is associated with the first set of micro-service instances and the second virtual network is associated with the second set of micro-service instances. This enables data from micro-service instances belonging to two different tenants, is isolated by using two different virtual networks.

In an example, the application policy comprises configuration information associated with the plurality of micro-service instances, wherein configuration information of each micro-service instance comprises tenant identifier, and process identifiers of related micro-service instances. In an example, defining the network overlay policy comprises generating an application policy graph from the application policy associated with the application workload. The application policy graph comprises a root node indicative of the application workload and a plurality of child nodes associated with the micro-services wherein an edge between two child nodes is indicative of a relationship between the corresponding two micro-services.

In an example, federating the cluster further comprises identifying a plurality of fault domains based on network information and the enclosure information associated with the plurality of computing nodes, and selecting the two or more computing nodes from the plurality of fault domains for federating a cluster. Each fault domain includes one or more computing nodes impacted by at least one of a corresponding network fault event and a corresponding enclosure fault event. In an example a first computing node from the two or more computing nodes, is from a first fault domain and a second computing node from the two or more computing nodes is from a second fault domain, where the first and second fault domains form a disjoint set, and every node from the first fault domain is distinct from the nodes of the second fault domain.

In an example, a graph model is generated from the network information and the enclosure information. Each node from the graph model is indicative of one of a computing node or a network device or any other device which is associated with the computing nodes. Accordingly a plurality of nodes in the graph model are associated with the plurality of computing nodes. Each sub-tree in the graph model is indicative of a fault domain from the plurality of fault domains and comprises a root node and one or more child nodes where the one or more computing nodes or network devices associated with the child nodes are impacted by a fault associated with a computing node or network device associated with the root node. Based on the graph model, the two or more computing nodes for federating the cluster are selected.

In an example, the first and second fault domains form a disjoint set such that every node from the first fault domain is distinct from every node of the second fault domain. In an example, the network information is determined based on Link Layer Discovery Protocol (LLDP) packets exchanged between the computing nodes and network devices, and Management Information Database (MIB) of the computing nodes and network devices. In an example, the network information comprises Internet Protocol addresses of the computing nodes, port group information of the ports on the computing nodes, and Local Area Network (LAN) information of the computing nodes. In an example, the plurality of interconnected computing nodes including a first set of physical nodes and a second set of virtual nodes.

In an example, defining the network overlay policy further comprises determining a first computing node and second computing node for deploying a first micro-service instance and second micro-service instance, wherein the first computing node is from a first fault domain and the second computing node is from the second fault domain, and wherein the first fault domain and the second fault domain form a disjoint set.

In an example, the current disclosure discloses a cluster management system. The cluster management system comprises a plurality of computing nodes connected via a plurality of network devices. One or more computing nodes are enclosed in server enclosures and share a common power unit. Each computing node is connected to other computing nodes over one or more network domains. A controller connected to the plurality of computing nodes. Upon receiving a request to deploy an application workload, the controller federates a cluster from a plurality of computing nodes, defines a network overlay policy based on an application policy associated with the application workload, configures one or more virtual networks in accordance with defined network overlay policy, and deploys the plurality of micro-service instances on the two or more computing nodes in accordance with the network overlay policy, for executing the application workload.

In an example, the current disclosure discloses a non-transitory machine-readable storage medium storing instructions that, when executed by at least one processor, cause the at least one processor to federates a cluster from a plurality of computing nodes, defines a network overlay policy based on an application policy associated with the application workload, configures one or more virtual networks in accordance with defined network overlay policy, and deploys the plurality of micro-service instances on the two or more computing nodes in accordance with the network overlay policy, for executing the application workload. These examples are explained below.

FIG. 1 is a block diagram of a system 100 for federating a cluster from a plurality of interconnected computing nodes. The system 100 includes three example racks 105, 110 and 115. Each rack comprises one or more Top of Rack (ToR) switches (107, 117 and 127), and master and satellite switches (125, 135 and 145), and a plurality of servers (108, 109, 118, 119, 128, 137, 138, 139, 147, 148, 157, 158, and 159). Communication between the servers in three racks is enabled via the ToR switches. The switches and the servers are housed within the racks. For example, rack 105 houses ToR switch 107, servers 108 and 109, and blade server enclosure or chassis 155. The server enclosure 155 contains a master switch 125 and blade servers 137, 138 and 139. The blade server 137, 138 and 139 share the master switch 125 and communicate to the ToR switch 117 via the master switch 125. Similarly, rack 110 houses ToR switch 117, servers 118 and 119, and blade server enclosure 165. The blade server enclosure 165 contains a satellite switch 135 and blade servers 147 and 148. The satellite switch 135 acts as a port extender for the master switch 125 and accordingly the blade servers 147 and 148 communicate via the master switch 125. Similarly, rack 115 houses ToR switch 127, server 128, and server enclosure 175. The server enclosure 175 contains a satellite switch 145 and blade servers 157, 158 and 159. The satellite switch 145 acts as a port extender for the master switch 125 and accordingly the blade servers 157, 158 and 159 communicate via the master switch 125. Servers 108 and 109 communicate through the ToR switch 107. Similarly server 118 and 119 communicate through ToR 117 and server 128 communicate through ToR 127.

Each computing node or server can be either a bare-metal server or can be a hypervisor by itself. A hypervisor can include multiple virtual machine nodes and virtual switches. The virtual switches provide network connectivity to the virtual machine nodes. Link aggregation group (LAG) and Multi-LAG and NIC teaming techniques may be used to provide high availability and resiliency. For example, server 108 may comprise two virtual machine nodes and a virtual switch. The virtual nodes are connected to the ToR switch 107 via the virtual switch.

Additionally, one or more sets of servers from the plurality of servers are blade servers (137, 138, 139, 147, 148, 157, 158, and 159) and are installed within server enclosures (155, 165 and 175). A server enclosure (e.g. enclosure 155) comprising a plurality of blade servers (137, 138 and 139) includes a common power source and can communicate with each other using a switch (e.g. master switch 125). In an embodiment, a plurality of blade servers in two enclosures (155 and 165) may share a master switch 125. The servers in the enclosure 165 are connected to the master switch 125 via a satellite switch 135. Communication between servers (147 and 148) in enclosure 165 and other servers (e.g. server 128) happens via the master switch 125 and satellite switch 135.

As generally described herein, a computing node refers to a computing device on a network, either a virtual or physical machine, such as a personal computer, a cell phone, a printer, or a server, among others. Each node may include a set of physical hardware that includes any number of processing resources (e.g., central processing units, graphics processing units, microcontrollers, application-specific integrated circuits, programmable gate arrays, and/or other processing resources), storage resources (e.g., random access memory, non-volatile memory, solid state drives, hard disk drives HDDs, optical storage devices, tape drives, and/or other suitable storage resources), network resources (e.g., Ethernet, IEEE 802.11 Wi-Fi, and/or other suitable wired or wireless network resources), I/O resources, and/or other suitable computing hardware. Each node may be connected to every other node in the cluster and may be capable transferring data and applications to every other node in the cluster.

Additionally, the system 100 also includes a controller 129 for deploying an application workload on a cluster federated from the plurality of the computing nodes. Application workloads are deployed on the clusters of computing nodes. A plurality of clusters may be created using the plurality of the computing nodes. In order to automatically create or spin up the clusters with nodes and deploy the application workload, the controller 129 selects and group the nodes based on physical placement of the nodes and network topology between the nodes. Then the controller 129 creates one or more virtual networks to enable the network infrastructure for the micro-service instances of the application workload. Then the controller 129 deploys the micro-services instances are deployed on the computing nodes of the cluster.

Clusters are systems which function as a closely coupled integrated unit taking the hybrid approach of combining the characteristics of loosely (physical separation of processors and independent instance of operating systems) and tightly coupled systems (physical proximity of processors and sharing of memory/operating systems instance). A cluster system consists of closely coupled multiple systems running a similar instance of operating system software with the ability to share resources like storage, memory. Examples include KUBERNETES, VSPHERE, GLUSTERFS and other such clustering software which distribute roles across multiple nodes providing both scalability and also resiliency.

A plurality of application workloads may be deployed on the cluster of computing nodes. Application workloads could be enterprise class applications including financial and banking applications, online retail applications pertaining transactions and database, high performance compute intensive workloads including modelling and simulation applications for weather, control applications related to oil and gas industries, workloads pertaining to artificial intelligence, etc.

Application workloads are based on the micro-service architecture and accordingly, are composed of a plurality of micro-services. Micro-service herein refers to a self-contained set of software routines and modules that accomplish a well-defined functionality. The output of the micro-service may be consumed by other micro-services. For, a banking application that can be based on a micro-service architecture, in which multiple functionalities are in turn implemented as micro-services. When the application workload is to be deployed on the compute cluster, a plurality of micro-service instances (of the micro-services) are created and deployed on the nodes of the compute cluster. The micro-service instances would coordinate with each other via one or more virtual networks. Application workloads could be dedicated to a single user/tenant or a plurality of users/tenants. Accordingly, the micro-service instances could be dedicated to a single tenant or distributed amongst multiple tenants.

In a large scale environment such as system 100, the controller 129 dynamically federates a cluster for application workload deployment by selecting the nodes for federating the cluster and by creating the virtual networks required for the functioning of the micro-service instances. The controller 129 collects the relevant information about the physical and virtual servers along with the network topology. The information is analyzed and a graph model is created. The controller 129 dynamically allocating nodes from different fault domain zones by traversing the graph model. Then, the controller 129 creates the virtual networks amongst the cluster nodes as required by the micro-services of the application workload to be deployed. The controller 129 analyses the application policy associated with the application workload and identifies the micro-services to be deployed and the network configuration required for the micro-service instances. From the application policy, the controller 129 generates the network overlay policy which indicates the configuration of the virtual networks. Finally, based the graph model, the controller 129 deploys the micro-service instances on the cluster nodes. Accordingly, the controller 129 ensures maximum fault isolation among the nodes and also ensures effective balanced infrastructure. This is further explained in the description of the FIG. 2.

Figure 2:
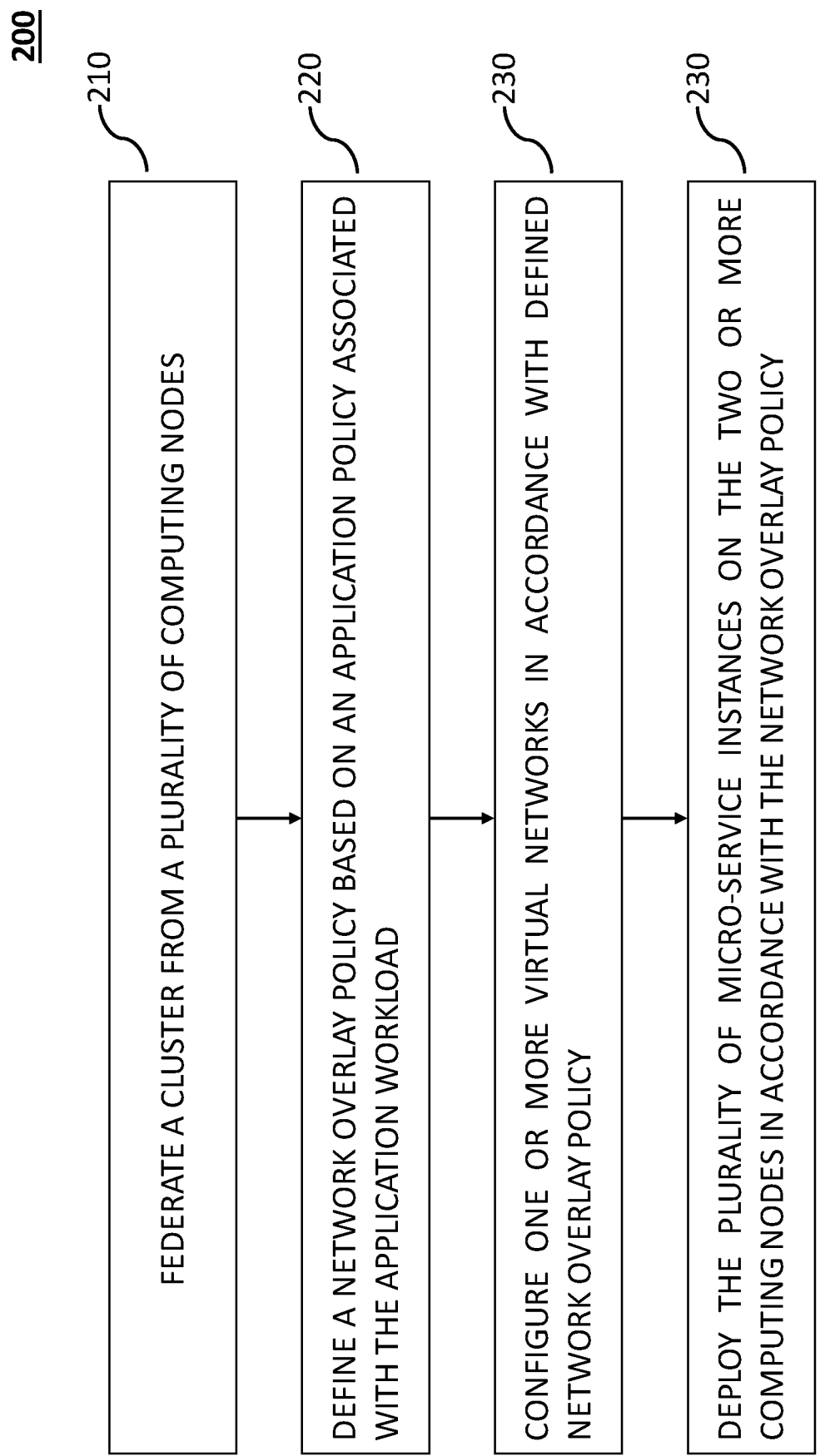
FIG. 2 is a flowchart of an example method for deploying an application workload on a cluster of computing nodes.

FIG. 2 illustrates a method 200 for deploying an application workload on a cluster federated from the plurality of computing nodes.

At step 210, the controller 129 federates the cluster from the plurality of computing nodes. In an example, the controller 129 receives network information and enclosure information associated with the plurality of the computing nodes.

Network information is indicative of network topology between the plurality of computing nodes. Enclosure information is indicative of a configuration of an enclosure associated with a corresponding computing node. In an example, enclosure information includes information regarding the power unit utilized by the corresponding computing node. In an example, network information is determined based on Link Layer Discovery Protocol (LLDP) packets exchanged between the computing nodes and the network devices. Additionally, the network information is determined on the basis of the Management Information Databases (MIB) of the computing nodes and the network devices. In an example, the controller 129 utilizes the chassis identifier and port identifier to determine the network device connected to the computing node. Based on this information the network topology is identified.

In an example, the network information comprises Internet Protocol addresses of the computing nodes, port group information of the ports on the computing nodes, Local Area Network information of the computing nodes. In an example, one or more computing nodes are connected over a virtual local area network. Accordingly, the Local Area Network (LAN) information includes information about physical and virtual LANs. In an example, the plurality of interconnected computing nodes including a first set of physical nodes and a second set of virtual nodes. In an example, one or more computing nodes are interconnected via a virtual switch (vSwitch). Accordingly, the network information comprises details of the virtual switch and nodes connected by the virtual switch.

Then, in the example the controller 129 identifies a plurality of fault domains based on network information and the enclosure information. Each fault domain includes one or more computing nodes impacted by at least one of a corresponding network fault event and a corresponding enclosure fault event. To identify the fault domains, the controller 129 generate a graph model from the network information and the enclosure information. Each node from the graph model is indicative of a computing node or a network device or any other device associated with a corresponding computing node. Each sub-tree in the graph model, comprising a root node and one or more child nodes, is indicative of a fault domain. The one or more computing nodes associated with the child nodes of the sub-tree are impacted by a fault associated with a device associated with the root node of the sub-tree. Accordingly, based on the sub-trees, the controller 129 identifies the plurality of fault domains.

In an example, the controller 129 generates a graph model such that the nodes with the least children are placed in the left most and right most positions and the nodes with more children as compared to the other sibling nodes, are placed closer to the center on the basis of the number of children. For example, based on sections of the network topology as shown in FIG. 1, the controller 129 generates a graph model 300 illustrated in FIG. 3.

The graph model 300 includes a root node 310 and two child nodes: node 330 and node 325. The nodes 330 and 325 are associated with TOR switches 107 and 117. In an example, the root node 310 is a hypothetical device and is indicative of the network. The node 325 has two child nodes 335 and 345 which are associated with the servers 118 and 119 in the second rack 110. Since the servers 118 and 119 are connected to the other devices in the system 100 via TOR switch 117, accordingly a fault in the TOR switch 117 would affect both the servers 118 and 119. This is reflected by the sub tree 315 comprising the parent node 325 (representative of TOR switch 117) and child nodes 335 and 345 (representative of servers 118 and 119). Accordingly, the sub tree 315 represents a fault domain linked with a fault in the TOR switch 117.

Similarly, the node 330 has three child nodes 355, 365 and 350. Nodes 355 and 365 are associated with the servers 108 and 109 in the first rack 105. Node 350 is associated with master switch 125. Since the servers 108 and 109, and master switch 125 are connected to the other devices in the system 100 via TOR switch 107, accordingly a fault in the TOR switch 107 would affect the servers 108 and 109, and the master switch 125. This is reflected by the sub tree comprising the parent node 330 (representative of TOR switch 107) and child nodes 350, 355 and 365 (representative of master switch 125, and servers 108 and 109; and their children). Accordingly, the sub tree 317 represents a fault domain linked with a fault in the TOR switch 107. Additionally, since the nodes 355 and 365 have less children (i.e. no children in this case) as compared to node 350 (which has four children), the nodes 355 and 365 are placed in the left and right most positions, while the node 350 is placed in between the two nodes 355 and 365.

Moreover, node 350 has four child nodes 375, 385, 395 and 360. The child nodes 375, 385, 395 and 360 are associated with servers 137, 138 and 139 and satellite switch 135. Since the servers 137, 138 and 139 and satellite switch 135 are connected to the TOR switch 107 via the master switch 125, accordingly a fault in the master switch 125 would affect the servers 137, 138 and 139, and satellite switch 135. This is reflected by the sub tree comprising the parent node 350 (representative of master switch 125) and child nodes, 360, 375, 385 and 395 a (representative of satellite switch 135, and servers 137, 138 and 139). Accordingly, the sub tree represents a fault sub-domain linked with a fault in the master switch 125. This fault sub-domain is included within the fault domain associated with the ToR switch 107. Additionally, since the nodes 385, 395 and 375 have less children (i.e. no children in this case) as compared to node 360 (which has two children), the nodes 375, 385 and 395 are placed in the left and right most positions, while the node 360 is placed in between the nodes 375 and 395.

Accordingly, based on the number of sub-trees in the graph model 300, the controller 129 determines the fault domains (e.g. two fault domains and two sub fault domains) in the system 100. For example, based on the graph model 300, the controller 129 determines a fault domain 317 associated with ToR switch 107 and a fault domain 315 associated with ToR switch 117. Additionally, the controller 129 determines a fault sub-domain associated with the master switch 125 within the fault domain 317. Similarly, the controller 129 determines a fault sub-domain associated with the satellite switch 135 within the fault sub-domain associated with the master switch 125.

Then, the controller 129 selects two or more computing nodes from the plurality of fault domains for federating the cluster. A first computing node from the two or more computing nodes, is from a first fault domain and a second computing node from the two or more computing nodes is from a second fault domain. In an example, the first and second fault domains form a disjoint set, such that every node from the first fault domain is distinct from the nodes of the second fault domain.

In an example, the controller 129 utilizes the graph model 300 to select the two or more computing nodes for federating the cluster. In an example, the controller 129 selects the first computing node and the second computing node by traversing from root of the graph model to extreme left most node in the graph model and to the right most node in the graph model. The computing node associated with the extreme left most node, is selected as the first computing node and the computing node associated with the extreme right most node, is selected as the second computing node. For selecting additional nodes for federating the cluster, the controller 129 follows the above mentioned sequence of traversing inwards in left and right alternatively from the root of the graph model, selecting nodes from fault domains from which no nodes were previously selected. In no additional fault domains exist i.e. at one node has been selected from all the fault domains, the process is repeated by selecting nodes from existing fault domains.

In another example, the controller 129 selects the two or more computing nodes based on a domain distance matrix and fault domain. The domain distance matrix comprises distance vectors between the computing nodes of the fault domains. The distance vector$_{ij}$ is a representation of a function of number of hops from Node$_i$ to Node$_j$. The value of the distance vector between two nodes is indicative of the degree of isolation between the nodes. In an example, the distance vector between two nodes is calculated on the basis of a path between the two nodes where the path runs through the root node. Based on the entries of the domain distance matrix, the controller 129 determines two or more computing nodes such that the distance vector is minimum and the computing nodes are from different fault domains.

Then at step 220, the controller 129 defines a network overlay policy based on the application policy associated with the application workload to be deployed on the federated cluster. Application policy associated with the application workload, includes definitions on the multiple micro-services of the application, and configuration information associated with micro-services such as the type of protocols used for communication amongst the micro-services, dependencies amongst the micro-services, the VLAN requirement and security parameters with respect to multi-tenancy aspect associated with the micro-services, etc. A relationship between two micro-service is defined on the basis of communication or dependency between the two micro-services. The relationship is derived based on the policy definition of the micro services. In an example the relationship could be one of a dependency where in one micro service consumes the output from another micro service for performing its functionality. In another example, the relationship can also be one of pipe-lined dependency wherein each micro service performs an orchestrated functionality in a sequential manner.

Figure 4:
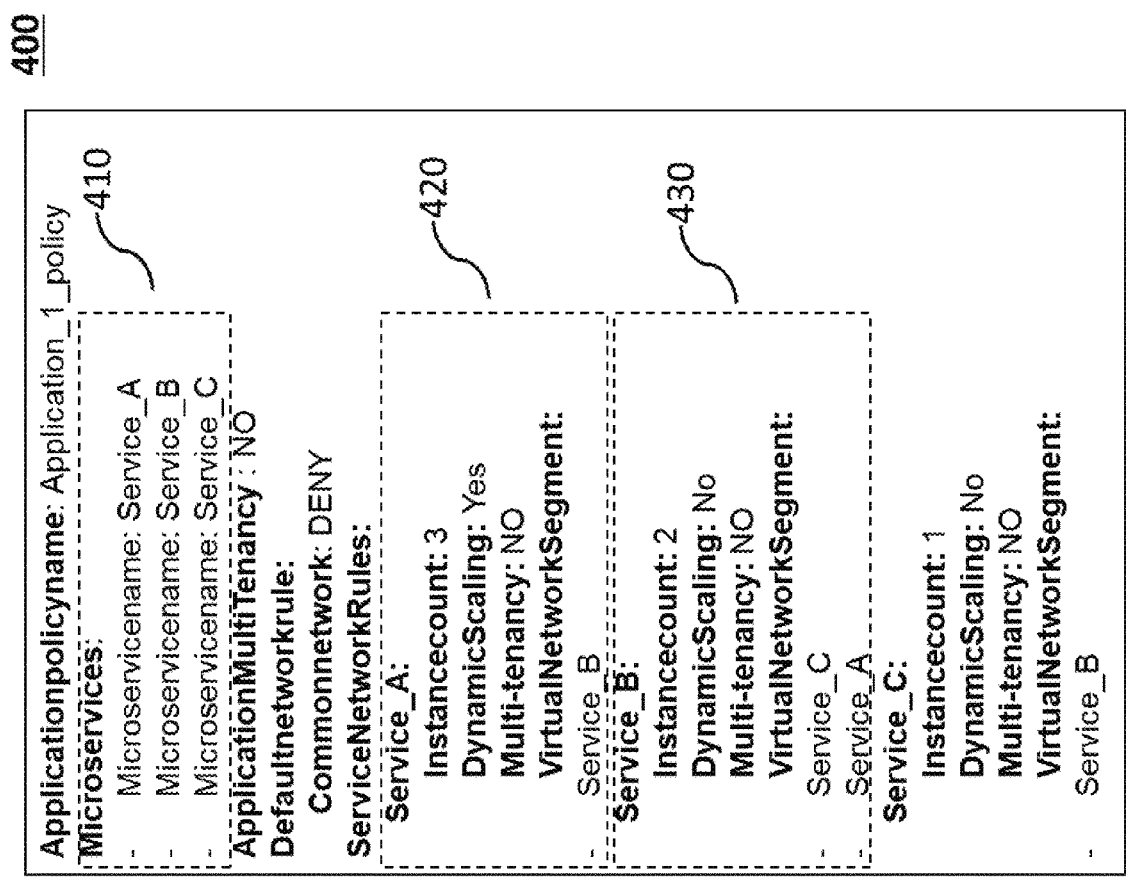
FIG. 4 is an example application policy of an application workload to be deployed on a cluster of computing nodes.

A section of an example application policy 400 is illustrated in FIG. 4. The example application 400 contains a list of micro-services required to be deployed for the application workload (as shown in section 410). In an embodiment, the list of micro-services includes the list of process identifiers associated with the micro-services. During deployment, the controller 129 creates instances of the micro-services as required and then deploys these micro-service instances on the nodes of the federated cluster. In the current case, the application policy 400 lists three micro-services: micro-service A, micro-service B and micro-service C. Network configuration for each micro-service is also provided in the example application policy 400 in form of network service rules. For example, for the micro-service A, the network configuration as shown in section 420, defines that the micro-service A is to be started with 3 instances and may be dynamically scaled as per user requirements or number of requests. The instances are associated with only a single tenant and need to have a layer-2 or link layer adjacent virtual network only with one or more instances of the micro-service B. Similarly, for the micro-service B, the network configuration as shown in section 430, defines that the micro-service A is to be started with 2 instances and is not be dynamically scaled. The instances are associated with only a single tenant and need to have a virtual network only with one or more instances of the micro-service A and C having layer 2 or link layer adjacency. Similarly, for the micro-service C, the network configuration as shown in section 440, defines that the micro-service A is to be started with 1 instances and is not be dynamically scaled. The instances are associated with only a single tenant and need to have a virtual network only with one or more instances of the micro-service B to have layer 2 or link layer adjacency.

Accordingly, the controller 129 analyses the application policy and defines a network overlay policy. A network overlay policy creates necessary network resources and configuration in compliance with the application policy definition and to enable the micro services instances to communicate with each other. The compliance ensures multi-tenancy in addition to creating the necessary L2 virtual overlay for the micro services to communicate. The network overlay policy defines the configuration of existing virtual networks and creation of new virtual networks in accordance with the application policy, for the deployment of the micro-service instances. In an example, as a sub step, the controller 129 generates an application policy graph from the application policy associated with the application workload. The application policy graph comprises a root node indicative of the application workload and a plurality of child nodes associated with the micro-services. An edge between two child micro-service nodes is indicative of a relationship between the corresponding two micro-services. Each child micro-service node has a plurality of child instance nodes which are to be deployed on the federated cluster. Child instances of related micro-services are connected via a virtual network node. Accordingly, based on the virtual network nodes, the controller 129 defines the network overlay policy. In an example, the network overlay policy further includes the deployment configuration of the micro-service instances. The deployment configuration of each micro-services defines the node from the cluster on which the micro-service instance is to be deployed. The deployment configuration is determined by the controller 129 on the basis of the application policy graph and the graph model of the cluster.

Figure 5:
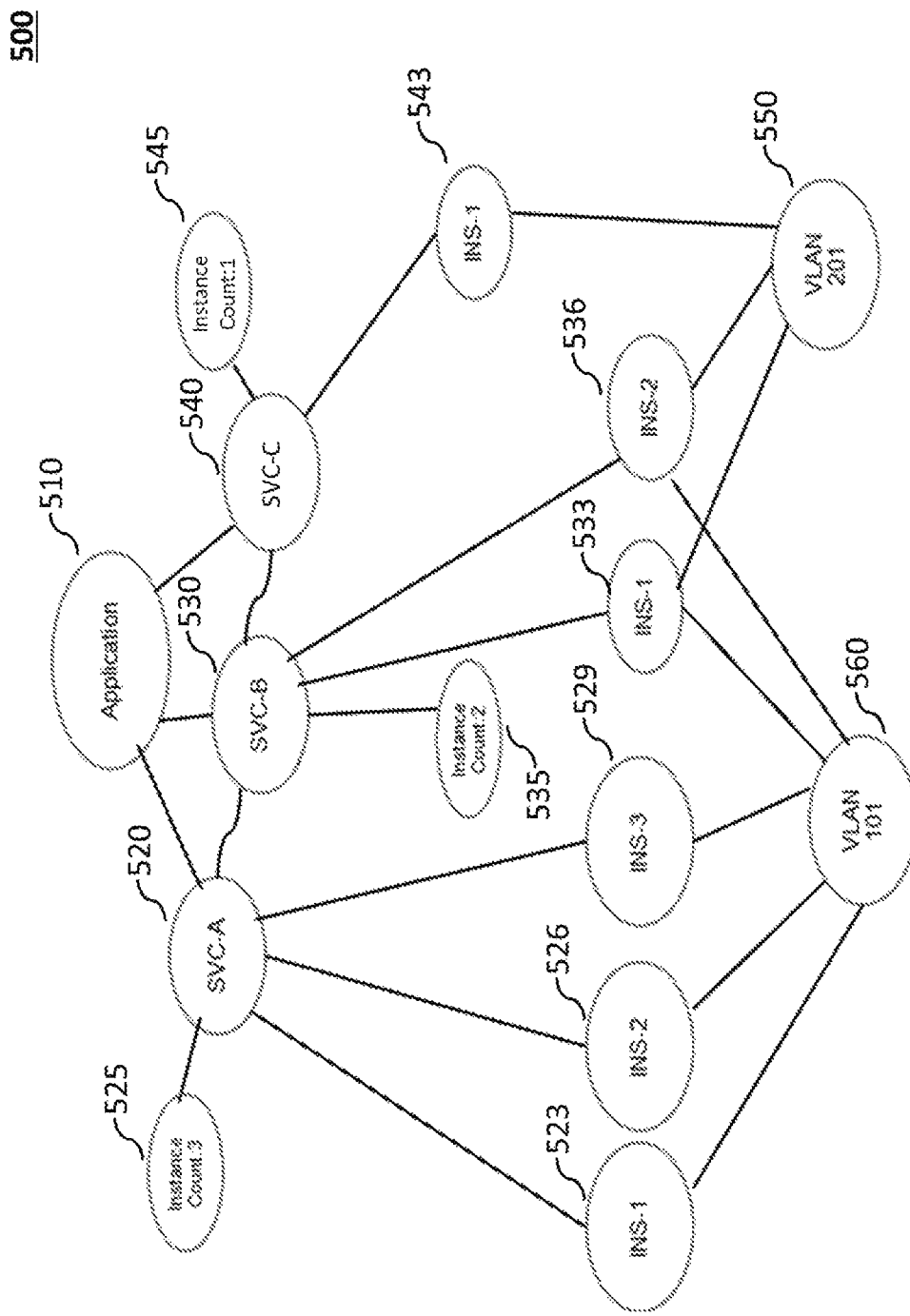
FIG. 5 is an example application policy graph model of an application workload to be deployed on a cluster of computing nodes.

An example application policy graph 500 is illustrated in FIG. 5. The example application policy graph 500 is generated from the example application policy 400 as shown in FIG. 4. The application policy graph contains a root node 510 associated with the application workload. Each of the micro-service required by the application workload (i.e. micro-service A, B and C) are represented as child micro-service nodes 520, 530 and 540 respectively, to the root node 510. The number of instances for each micro service is stored in an adjacent node (525, 535 and 545). Additional micro-services may be added to the application workload and the application policy graph is modified accordingly by the controller 129 to include new child micro-service nodes for the newly added micro-services. A relationship between two micro-services is represented as an edge between the two child micro-service nodes. For example, the network configuration of micro-service A requires a virtual network between the instances of micro-service A and instances of micro-service B. Accordingly this is represented by an edge between the child micro-service node 520 (associated with micro-service A) and child micro-service node 530 (associated with micro service B). Similarly in accordance with the application policy 400, an edge is present between child micro-service node 530 (micro-service B) and child micro-service node 540 (micro-service C).

Each child micro-service node includes a plurality of child micro-service instance nodes to be deployed. In the current example, the application policy graph 500 is generated prior to the deployment of the application workload and accordingly, the number of child micro-service instances to be deployed for each micro-service at the start of the corresponding micro-service is specified in the example application policy 400. Accordingly child micro-service node 520 associated with micro-service A has three child micro-service instance nodes 523, 526 and 529 as specified in the application policy 400. Child micro-service node 530 associated with micro-service B has two child micro-service instance nodes 533 and 536 as specified in the application policy 400. Child micro-service node 540 associated with micro-service C has one child micro-service instance nodes 543 as specified in the application policy 400. While the application policy graph 500 has only six child micro-service instance nodes (523, 526, 529, 533, 536 and 543), additional child micro-service instance nodes may be added when there is an increase in user requests for handling the increase. For example, since dynamic scaling is enabled for micro-service A, at a time of increased demand, additional child micro-service instance nodes may be created. These additional child micro-service instance nodes would be representative of the additional micro-service instances of micro-service A to be deployed to handle the increase in demand. Additionally, each micro-service instance from the plurality of micro-service instances, is associated with at least one tenant. In current application policy 400, all the micro-service instances below to one single tenant. Accordingly, virtual network nodes are created in the application graph policy 500 to represent virtual networks for connecting the micro-service instances in accordance with the application policy 400. In the current example, a VLAN node 560 connects the instances 523, 526 and 529 (instances of micro-service A) to the instances 533 and 536 (instances of micro-service B) in accordance with the application policy 400. Similarly, a VLAN node 550 connects the instances 543 (instance of micro-service C) to the instances 533 and 536 (instances of micro-service B) in accordance with the application policy 400.

In an example, subsequent to the creation of the application policy graph, the controller 129 determines the cluster nodes on which the micro-service instances are to be deployed. Taking an example of graph model 300, the cluster on which the application workload is to be deployed is a four node cluster comprising of nodes 335, 345, 355 and 365. As per the application policy graph, the controller 129 is to deploy the instances represented by child micro-service instance nodes 523, 526, 529, 533, 536 and 543 on the cluster nodes 335, 345, 355 and 365. Accordingly in an example, similar to node selection for the federation of cluster as described in the previous step, the controller 129 deploys the instances amongst the cluster nodes such that instances of a micro-service are spread across the various fault domains. In the current case, controller 129 starts by arbitrarily selecting node 335 for deploying instance INS-1 of micro-service A (523). For deploying instance INS-2 of micro-service A (526), the controller 129 determines a cluster node which is sufficiently isolated from cluster node 335. Accordingly, the controller 129 selects the cluster node 365. For deploying instance INS-3 of micro-service A (529), the controller 129 determines a cluster node which is sufficiently isolated from cluster node 335 and cluster node 365. Accordingly, the controller 129 selects the cluster node 345 (since both 345 and 355 have the same isolation from the nodes 335 and 365). For deploying instance INS-2 of micro-service B (533), the controller 129 determines arbitrarily selects cluster node 355. For deploying instance INS-2 of micro-service B (536), the controller 129 determines a cluster node which is sufficiently isolated from cluster node 355. Accordingly, the controller 129 selects the cluster node 335. For deploying instance INS-1 of micro-service C (543), the controller 129 selects cluster node 365.

Accordingly, subsequent to the creation of the application policy graph, the controller 129 determines if one or more virtual networks as represented in the application policy graph are already present in the cluster. If the virtual networks are already present, the controller 129 selects these virtual networks for configuration and includes the same in the network policy overlay. If the required virtual networks are not present, the controller 129 defines new virtual networks in the network overlay policy, for the deployment of the micro-service instances. Continuing the above mentioned example in relation to application node, since the current cluster does not have any virtual networks, the controller 129 defines a first virtual network between the cluster nodes 335, 345, 355 and 365 for enabling L2-L7 communication between micro-service instances of micro-service A and B. Then the controller 129 defines a second virtual network between cluster nodes 335, 355 and 365 for enabling L2-L7 communication between instances of micro-services B and C.

Then at step 230, the controller 129 configures one or more virtual networks in accordance with the network overlay policy. As mentioned previously, each virtual network from one or more virtual networks connects one or more computing nodes from the two or more computing nodes of the cluster for providing layer 2 adjacency required for the communication amongst the instances of the micro-services deployed. As mentioned above, if required virtual networks already exist between the nodes of the cluster, the controller configures these existing virtual networks for enabling communication between the micro-service instances. If the required virtual networks do not exist, the controller 129 creates the virtual networks based on the network overlay policy. Based on the network topology between the cluster nodes, the controller 129 may determine whether the virtual network to be created is one of a virtual local area network (VLAN) or virtual extensible local area network (VXLAN). When the nodes between which the virtual network is to be created are connected to the same switch, the controller creates and configures a VLAN. When the nodes between which the virtual network is to be created are connected to the different switches, the controller creates and configures a VXLAN. Configuration of a network herein refers to identification of the network manager of the corresponding switch. Controller 129 interacts with the network manager and configures the necessary port with VLAN that creates the virtual network configuration. For VXLAN, Controller 129 interacts with the VTEP (Virtual Tunnel Endpoint) to create the VXLAN network between the cluster nodes.

In another example, the application policy may define one or more micro-services to be multi-tenant compliant. Accordingly, in such cases, the application policy graph would have additional virtual networks for ensuring data isolation and security amongst the instances belonging to different tenants. Accordingly, while configuring one or more virtual networks in accordance with the defined network overlay policy, the controller 129 identifies first set of micro-service instances associated with a first tenant and a second set of instances associated with a second tenant based on the application policy associated with the application workload, and then configures a first virtual network and a second virtual network from the one or more virtual networks, such that the first and second virtual networks are different.

For example, the application policy graph 600 illustrates a multitenant deployment of an application workload. The application policy graph contains a root node 610 associated with the application workload. Each of the micro-service required by the application workload (i.e. micro-service A, B and C) are represented as child micro-service nodes 620, 630 and 640 respectively, to the root node 610. The number of instances for each micro service is stored in an adjacent node (625, 635 and 645). Additional micro-services may be added to the application workload and the application policy graph is modified accordingly by the controller 129 to include new child micro-service nodes for the newly added micro-services. A relationship between two micro-services is represented as an edge between the two child micro-service nodes. For example, the network configuration of micro-service A requires a virtual network between the instances of micro-service A and instances of micro-service B. Accordingly this is represented by an edge between the child micro-service node 620 (associated with micro-service A) and child micro-service node 630 (associated with micro service B). Similarly, an edge is present between child micro-service node 630 (micro-service B) and child micro-service node 640 (micro-service C).

Each child micro-service node includes a plurality of child micro-service instance nodes to be deployed. Child micro-service node 620 associated with micro-service A has three child micro-service instance nodes 623, 626 and 629. Child micro-service node 630 associated with micro-service B has three child micro-service instance nodes 633, 636 and 639. Child micro-service node 640 associated with micro-service C has three child micro-service instance nodes 643, 646 and 649. Additionally, each micro-service instance from the plurality of micro-service instances, is associated with a tenant. In current example, the micro-service instances 623, 633 and 643 below to a first tenant. The micro-service instances 626, 636 and 646 below to a second tenant. The micro-service instances 629, 639 and 649 below to a third tenant. Accordingly, virtual network nodes are created in the application graph policy 600 to represent virtual networks for connecting the micro-service instances in accordance with the application policy. In the current example, a VLAN node 650 connects the instances 623, and 633, and VLAN node 665 connects instances 633 and 643. VLAN node 655 connects the instances 626, and 636, and VLAN node 670 connects instances 636 and 646. Similarly, a VLAN node 660 connects the instances 629 and 639, and VLAN node 675 connects instances 639 and 649.

Accordingly, while configuring the virtual networks, the controller 129 ensure that there are 6 virtual networks for ensuring isolation amongst the micro-services and the micro-service instances of the three tenants.

Then at step 240, the controller 129 deploys the plurality of the micro-service instances on the two or more computing nodes in accordance with the network overlay policy. In an example, based on the nodes selected for each micro-service instance (as deployment configuration in the network overlay policy) and the virtual networks configured, the controller deploys each micro-service instance on a cluster node.

While FIG. 2 is explained using physical computing nodes, the current invention may be realized in a system with physical and virtual nodes. The virtual nodes as mentioned above may include virtual computing nodes (virtual machines) and virtual switches. Additionally, protocols such as link aggregation protocol, NIC teaming etc., may be represented as single edges in the graph model. Additionally, which the example explained using FIGS. 3 and 4 require creation of new virtual networks, as mentioned previously preexisting virtual networks may be utilized for the deployment of the application workload. Additionally, one or more steps of the method 200 may be repeated when the scale of application workload changes. For example, when additional micro-service instances are required for handling an increase in workload, steps 220-240 may be repeated. The application policy graph is modified to include the additional instances to be deployed. A new network overlay policy is generated and new virtual networks may be created and finally the additional micro-service instances may be deployed.

Figure 3:
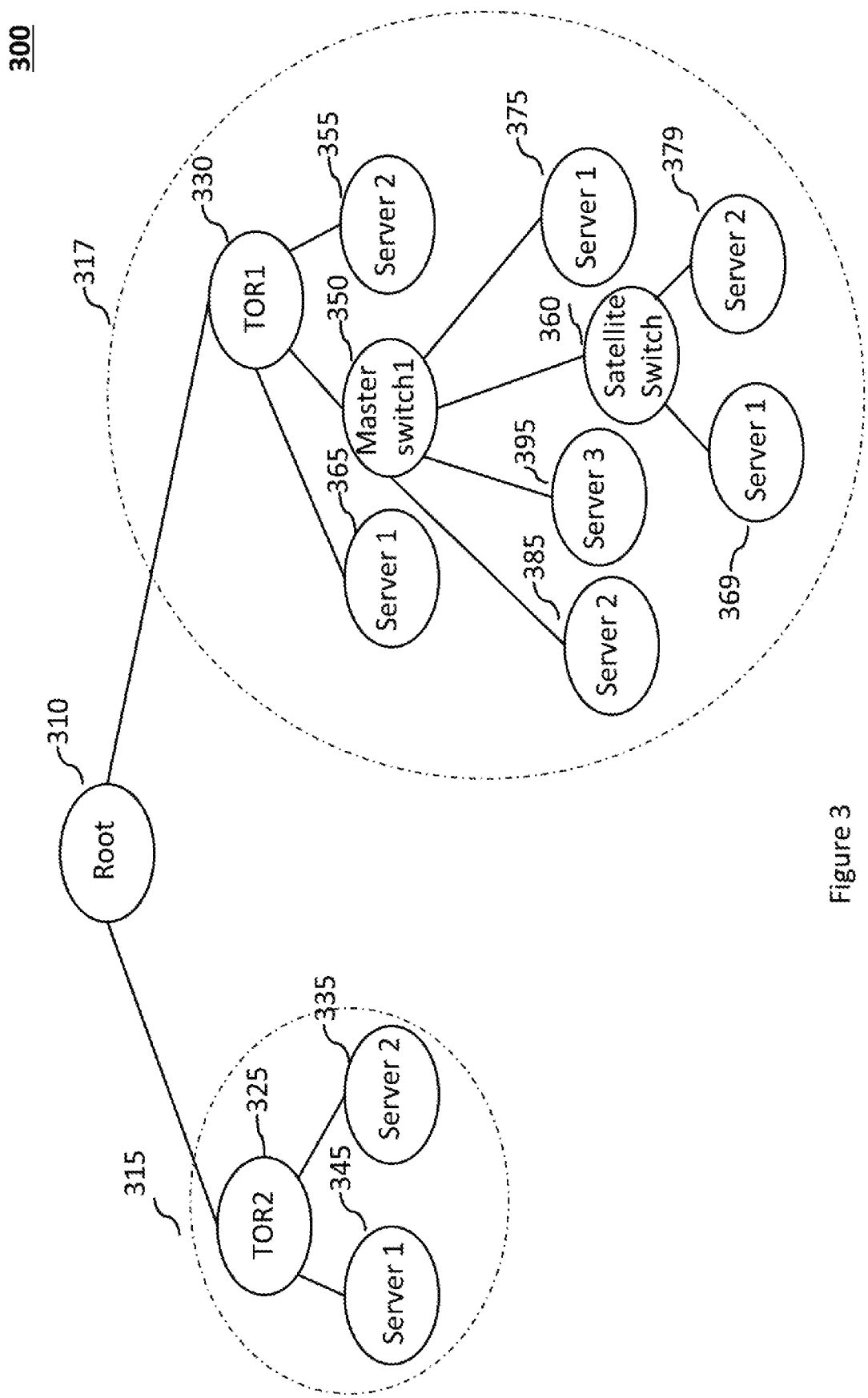
FIG. 3 is an example graph model of a section of a system comprising a plurality of computing nodes.

FIG. 3 illustrates an example graph model 300 of a section of the system 100. The section of the system 100 comprises elements of rack 105 and rack 110. In order to make the example simple, elements of rack 115 have not been considered.

FIG. 4 illustrates an example application policy 400 of an application workload. The example application policy lists three example micro-services (A, B and C) and their configuration.

FIG. 5 illustrates an example application policy graph 500. The example application policy graph 500 is generated by the controller 129 by analyzing the example application policy 400. The example application policy graph 500 is utilized in the configuration/creation of virtual networks.

Figure 6:
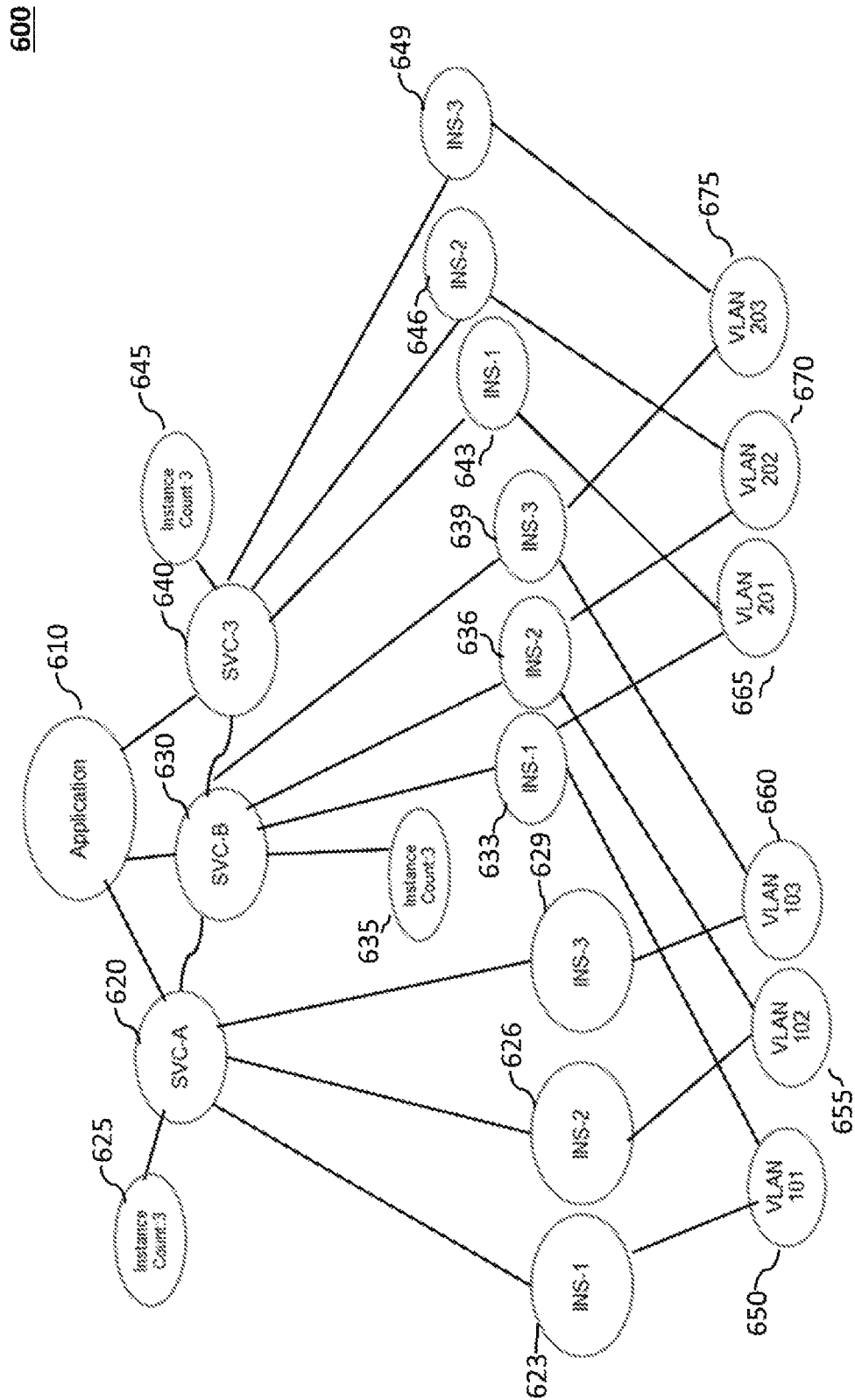
FIG. 6 is another example application policy graph model of an application workload to be deployed on a cluster of computing nodes and FIG. 7 is a block diagram of an example controller with machine-readable medium for federating a cluster from a plurality of computing nodes.

FIG. 6 illustrates an example application policy graph 500. The example application policy graph 600 is generated by the controller 129 by analyzing an example application policy with multitenancy enabled for micro-service instances (not shown in figures). The example application policy graph 600 is utilized in the configuration/creation of virtual networks in accordance with the multitenancy aspect of the example application policy.

Figure 7:
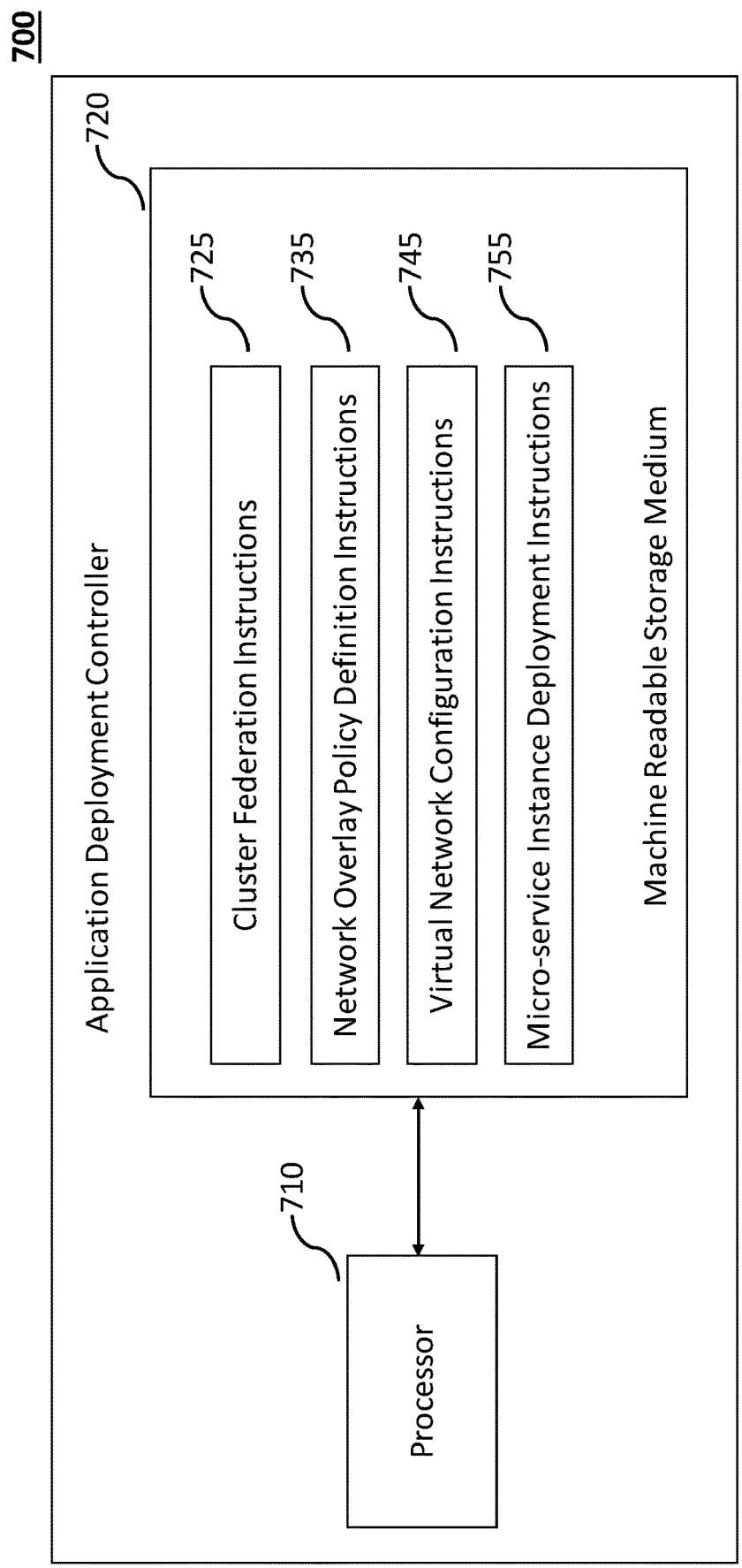

FIG. 7 is a block diagram of an application deployment controller 700 with machine-readable medium 720 for deploying an application on a plurality of computing nodes. Machine-readable medium 720 is communicatively coupled to a processor 710. The controller 700 (machine-readable medium 720 and processor 710) may, for example, be included as part of computing system 100 illustrated in FIG. 1 (for example as controller 129). Although the following descriptions refer to a single processor and a single machine-readable storage medium, the descriptions may also apply to a system with multiple processors and/or multiple machine-readable storage mediums. In such examples, the instructions may be distributed (e.g., stored) across multiple machine-readable storage mediums and the instructions may be distributed (e.g., executed by) across multiple processors.

Processor 710 may be central processing units (CPUs), microprocessors, and/or other hardware devices suitable for retrieval and execution of instructions stored in machine-readable storage medium 720. In the example shown in FIG. 7, processor 710 may fetch, decode, and execute machine-readable instructions 720 (including instructions 525-555) for deploying an application (i.e. the application workload) on a plurality of computing nodes. As an alternative or in addition to retrieving and executing instructions, processor 710 may include electronic circuits comprising a number of electronic components for performing the functionality of the instructions in machine-readable storage medium 720. With respect to the executable instruction representations (e.g., boxes) described and shown herein, it should be understood that part or all of the executable instructions and/or electronic circuits included within one box may, in some examples, be included in a different box shown in the figures or in a different box not shown.

Machine-readable storage medium 720 may be any electronic, magnetic, optical, or other physical storage device that stores executable instructions. Thus, machine-readable storage medium 520 may be, for example, Random Access Memory (RAM), a nonvolatile RAM (NVRAM) (e.g., RRAM, PCRAM, MRAM, etc.), an Electrically-Erasable Programmable Read-Only Memory (EEPROM), a flash memory, a storage drive, an optical disc, and the like. Alternatively, machine-readable storage medium 720 may be a portable, external or remote storage medium, for example, that allows a computing system to download the instructions from the portable/external/remote storage medium. In this situation, the executable instructions may be part of an "installation package". As described herein, machine-readable storage medium 720 may be encoded with executable instructions for federating a cluster from a plurality of computing nodes.

Referring to FIG. 7, cluster federation instructions 725, when executed by processor 710, may cause the processor to federate a cluster with nodes from the plurality of the computing nodes. Network overlay policy definition instructions 735, when executed by the processor 710, define a network overlay policy from the application policy associated with the application workload. Virtual network configuration instructions 745, when executed by the processor 710, may cause the processor to configure one or more virtual networks to enable L2-adjanceny. Micro-service deployment instructions 755, when executed by the processor 710, cause the processor to deploy the micro-service instances of the application workload on the cluster nodes.

Accordingly, the current invention discloses one or more example methods by which a network information and enclosure information of the hybrid environment is analyzed and represented as a graph model. Multiple fault domains are identified based on the graph model. Then, the graph model is used to select a group of nodes that are in different fault domains for federating clusters dynamically. Then the application policy of an application workload based on a micro-service architecture is analyzed and a network overlay policy is defined. Based on the network overlay policy, the virtual networks for the application workload are configured and the corresponding micro-service instances are deployed on the federated cluster. The current disclosure enables automatic ability to spin up clusters with hosts spread across multiple fault domains and deploy application workload by software driven automatic allocation of nodes and creation of virtual networks. The current disclosure discloses example methods which are highly scalable across hundreds of racks in a datacenter. Additionally, the current disclosure allows for efficient application deployment by effective allocation of nodes and creation of virtual networks that are resilient.

The foregoing disclosure describes a number of example implementations for deploying an application workload on a plurality of computing nodes. The disclosed examples may include systems, devices, computer-readable storage media, and methods for deploying an application workload. For purposes of explanation, certain examples are described with reference to the components illustrated in FIGS. 1-7. The functionality of the illustrated components may overlap, however, and may be present in a fewer or greater number of elements and components. Further, all or part of the functionality of illustrated elements may co-exist or be distributed among several geographically dispersed locations. Additionally, while the current disclosure is described in the context of datacenters, the current disclosure may utilized in other environments such as cloud environments, industrial and factory environments, etc.

Moreover, the disclosed examples may be implemented in various environments and are not limited to the illustrated examples. Further, the sequence of operations described in connection with FIG. 2 is an example and is not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

The invention claimed is:

1. A method for deploying an application workload, the method comprising:
federating a cluster from a plurality of computing nodes, wherein each computing node is connected to other computing nodes from the plurality of computing nodes by one or more network devices and wherein the cluster comprises two or more computing nodes from the plurality of computing nodes;
defining a network overlay policy based on an application policy associated with the application workload, wherein the application workload comprises a plurality of micro-service instances and wherein the application policy is indicative of one or more relationships between the plurality of the micro-service instances, and comprises configuration information associated with the plurality of micro-service instances, wherein configuration information of each micro-service instance comprises tenant identifiers and process identifiers associated with related micro-service instances;

configuring one or more virtual networks in accordance with the defined network overlay policy, wherein each virtual network from the one or more virtual networks connects one or more computing nodes from the two or more computing nodes of the cluster for providing layer 2 adjacency; and deploying the plurality of micro-service instances on the two or more computing nodes in accordance with the defined network overlay policy, for executing the application workload.

2. The method as claimed in claim 1, wherein each micro-service instance from the plurality of micro-service instances, is associated with at least one tenant and wherein configuring one or more virtual networks in accordance with the defined network overlay policy further includes:

identifying a first set of micro-service instances associated with a first tenant and a second set of micro-service instances associated with a second tenant based on the application policy associated with the application workload;

configuring a first virtual network and a second virtual network from the one or more virtual networks, wherein the first virtual network is associated with the first set of micro-service instances and the second virtual network is associated with the second set of micro-service instances.

3. The method as claimed in claim 1, wherein defining the network overlay policy comprises generating an application policy graph from the application policy associated with the application workload, wherein the application policy graph comprises a root node indicative of the application workload and a plurality of child nodes associated with the plurality of micro-service instances.

4. The method as claimed in claim 1, wherein federating the cluster further comprises:

identifying a plurality of fault domains based on network information and enclosure information associated with the plurality of computing nodes, wherein each fault domain includes one or more computing nodes impacted by at least one of a corresponding network fault event and a corresponding enclosure fault event; and selecting the two or more computing nodes from the plurality of fault domains for federating a cluster, wherein a first computing node from the two or more computing nodes is from a first fault domain and a second computing node from the two or more computing nodes is from a second fault domain, wherein the first and second fault domains form a disjoint set, and every node from the first fault domain is distinct from the nodes of the second fault domain.

5. The method as claimed in claim 4, wherein selecting two or more computing nodes further comprises:

generating a graph model from the network information and enclosure information, wherein a plurality of nodes from the graph model are indicative of the plurality of computing nodes and wherein each sub-tree in the graph model is indicative of a fault domain from the plurality of fault domains, each sub-tree comprises a root node and one or more child nodes wherein the one or more computing nodes associated with the child nodes are impacted by a fault associated with associated with the root node; and determining the first computing node and the second computing node, wherein distance of a path between a first node associated with the first computing node in the graph model and a second node associated with the second computing node via the root node of the graph model is less than distance of paths between other nodes in the graph model via the root node of the graph model.

6. The method as claimed in claim 1, wherein the plurality of computing nodes including a first set of physical nodes and a second set of virtual nodes.

7. The method as claimed in claim 1, wherein one or more computing nodes are interconnected via a virtual switch (vSwitch).

8. The method as claimed in claim 1, wherein defining the network overlay policy further comprises determining a first computing node and a second computing node for deploying a first micro-service instance and a second micro-service instance, wherein the first computing node is from a first fault domain and the second computing node is from the second fault domain, and wherein the first fault domain and the second fault domain form a disjoint set.

9. A cluster management system, the cluster management system comprising:

a plurality of computing nodes, wherein each computing node is connected to other computing nodes via one or more network devices;

a controller connected to the plurality of computing nodes, the controller for:

federating a cluster from a plurality of computing nodes, wherein each computing node is connected to other computing nodes from the plurality of computing nodes by one or more network devices and wherein the cluster comprises two or more computing nodes from the plurality of computing nodes;

defining a network overlay policy based on an application policy associated with an application workload, wherein the application workload comprises a plurality of micro-service instances and wherein the application policy is indicative of one or more relationships between the plurality of the micro-service instances, and comprises configuration information associated with the plurality of micro-service instances, wherein configuration information of each micro-service instance comprises tenant identifiers and process identifiers associated with related micro-service instances;

configuring one or more virtual networks in accordance with the defined network overlay policy, wherein each virtual network from the one or more virtual networks connects one or more computing nodes from the two or more computing nodes of the cluster for providing layer 2 adjacency; and deploying the plurality of micro-service instances on the two or more computing nodes in accordance with the defined network overlay policy, for executing the application workload.

10. The cluster management system as claimed in claim 9, wherein the plurality of computing nodes including a first set of physical nodes and a second set of virtual nodes.

11. The cluster management system as claimed in claim 9, wherein one or more computing nodes are interconnected via a virtual switch (vSwitch).

12. A non-transitory machine-readable storage medium storing instructions that, when executed by at least one processor, cause the at least one processor to:
- federate a cluster from a plurality of computing nodes, wherein each computing node is connected to other computing nodes from the plurality of computing nodes by one or more network devices and wherein the cluster comprises two or more computing nodes from the plurality of computing nodes;
- define a network overlay policy based on an application policy associated with an application workload, wherein the application workload comprises a plurality of micro-service instances and wherein the application policy is indicative of one or more relationships between the plurality of the micro-service instances, and comprises configuration information associated with the plurality of micro-service instances, wherein configuration information for each micro-service instance comprises tenant identifiers and process identifiers associated with related micro-service instances;
- configure one or more virtual networks in accordance with the defined network overlay policy, wherein each virtual network from the one or more virtual networks connects one or more computing nodes from the two or more computing nodes of the cluster for providing layer 2 adjacency; and
- deploy the plurality of micro-service instances on the two or more computing nodes in accordance with the defined network overlay policy, for executing the application workload.

13. The non-transitory machine-readable storage medium as claimed in claim 12, wherein each micro-service instance from the plurality of micro-service instances, is associated with at least one tenant and wherein instructions to configure one or more virtual networks in accordance with the defined network overlay policy, further includes instructions that when executed by the at least one processor, causes the at least one processor to:
- identify a first set of micro-service instances associated with a first tenant and a second set of micro-service instances associated with a second tenant based on the application policy associated with the application workload;
- configure a first virtual network and a second virtual network from the one or more virtual networks, wherein the first virtual network is associated with the first set of micro-service instances and the second virtual network is associated with the second set of micro-service instances.

14. The non-transitory machine-readable storage medium as claimed in claim 12, wherein instructions to define the network overlay policy further includes instructions that when executed by the at least one processor, causes the at least one processor to generate an application policy graph from the application policy associated with the application workload, wherein the application policy graph comprises a root node indicative of the application workload and a plurality of child nodes associated with the plurality of micro-service instances.

15. The non-transitory machine-readable storage medium as claimed in claim 12, wherein instructions to federate the cluster includes instructions that when executed by the at least one processor, causes the at least one processor to:
- identify a plurality of fault domains based on network information and enclosure information associated with the plurality of computing nodes, wherein each fault domain includes one or more computing nodes impacted by at least one of a corresponding network fault event and a corresponding enclosure fault event; and
- select the two or more computing nodes from the plurality of fault domains for federating a cluster, wherein a first computing node from the two or more computing nodes is from a first fault domain and a second computing node from the two or more computing nodes is from a second fault domain, wherein the first and second fault domains form a disjoint set, and every node from the first fault domain is distinct from the nodes of the second fault domain.

16. The non-transitory machine-readable storage medium as claimed in claim 12, wherein the plurality of computing nodes including a first set of physical nodes and a second set of virtual nodes.

17. The non-transitory machine-readable storage medium as claimed in claim 12, wherein one or more computing nodes are interconnected via a virtual switch (vSwitch).

* * * * *